(12) United States Patent
Oosawa

(10) Patent No.: US 10,443,549 B2
(45) Date of Patent: Oct. 15, 2019

(54) INTAKE MANIFOLD

(71) Applicant: Mikuni Corporation, Tokyo (JP)

(72) Inventor: Hirobumi Oosawa, Kanagawa (JP)

(73) Assignee: Mikuni Corporation, Tokyo (JP)

( * ) Notice: Subject to any disclaimer, the term of this patent is extended or adjusted under 35 U.S.C. 154(b) by 0 days.

(21) Appl. No.: 15/753,143

(22) PCT Filed: Aug. 17, 2016

(86) PCT No.: PCT/JP2016/074033
§ 371 (c)(1),
(2) Date: Feb. 15, 2018

(87) PCT Pub. No.: WO2017/033816
PCT Pub. Date: Mar. 2, 2017

(65) Prior Publication Data
US 2018/0245552 A1 Aug. 30, 2018

(30) Foreign Application Priority Data
Aug. 25, 2015 (JP) .................................. 2015-165968

(51) Int. Cl.
*F02M 35/10* (2006.01)
*F02M 35/112* (2006.01)
*F02M 35/104* (2006.01)
*F02M 35/16* (2006.01)

(52) U.S. Cl.
CPC ...... *F02M 35/10275* (2013.01); *F02M 35/10* (2013.01); *F02M 35/104* (2013.01);
(Continued)

(58) Field of Classification Search
CPC ....... F02M 35/10275; F02M 35/10144; F02M 35/10032; F02M 35/10262;
(Continued)

(56) References Cited

U.S. PATENT DOCUMENTS 6,655,338 B2 * 12/2003 Tsubouchi ............ F02B 61/045
123/184.57
2001/0039908 A1 11/2001 Bilek et al.
(Continued)

FOREIGN PATENT DOCUMENTS

DE 19814979 A1 10/1999
DE 102011015238 A1 9/2012
(Continued)

OTHER PUBLICATIONS

International Search Report and Written Opinion in International Application No. PCT/JP2016/074033, dated Oct. 18, 2016.
Extended European Search Report in corresponding European Patent Application No. 16839163.9, dated Mar. 26, 2019.

*Primary Examiner* — Marguerite J McMahon
(74) *Attorney, Agent, or Firm* — Venable LLP; Henry J. Daley

(57) ABSTRACT

To provide an intake manifold which can reliably prevent the step from being formed in the inner wall surface of the intake passage (15) while having provided therein the fitting holding portion (32) for fitting and holding the flame arrester (25) in the axial direction, the intake manifold (10) includes a base member (21), a cover member (22) and a flame arrester (25) having a flame suppression structure. Between the flame arrester (25) and the radical stepped surface (31*b*) of the recessed body portion (31) is provided a retaining rectifying member (23) that prevents the flame arrester (25) from coming off with respect to the fitting holding portion (32) and forms a third inner peripheral surface (23*a*) continuous without a step from an opening portion on the other end side (25*b*) of the flame arrester (25) to the base side second inner wall surface (31*c*).

4 Claims, 11 Drawing Sheets

(52) U.S. Cl.
CPC .. *F02M 35/10032* (2013.01); *F02M 35/1036* (2013.01); *F02M 35/10144* (2013.01); *F02M 35/10262* (2013.01); *F02M 35/10321* (2013.01); *F02M 35/10347* (2013.01); *F02M 35/112* (2013.01); *F02M 35/167* (2013.01)

(58) Field of Classification Search
CPC ......... F02M 35/1036; F02M 35/10347; F02M 35/104; F02M 35/112; F02M 35/10; F02M 35/167
USPC ........................................ 123/184.21–184.61
See application file for complete search history.

(56) References Cited

U.S. PATENT DOCUMENTS

| | | | | |
|---|---|---|---|---|
| 2006/0000437 A1* | 1/2006 | Kito | ................. | F02M 35/10019 123/184.21 |
| 2010/0147246 A1* | 6/2010 | Inaba | ..................... | F02M 35/02 123/184.57 |
| 2014/0261279 A1 | 9/2014 | Horii | | |

FOREIGN PATENT DOCUMENTS

| | | | | |
|---|---|---|---|---|
| EP | 2130567 A1 | 12/2009 | | |
| JP | 2006-46069 A | 2/2006 | | |
| JP | 2015-59431 A | 3/2015 | | |
| JP | 2015-140699 | 8/2015 | | |
| JP | 2017044106 A * | 3/2017 | ....... | F02M 35/10262 |
| WO | 2014/044371 A2 | 3/2014 | | |

* cited by examiner

INTAKE MANIFOLD

CROSS REFERENCE TO RELATED APPLICATIONS

This application is a U.S. National Stage Application under 35 U.S.C. § 371 of PCT/JP2016/074033, filed on Aug. 17, 2016, the entire content of which is hereby incorporated by reference, and claims the benefit of Japanese Patent Application No. 2015-165968, filed Aug. 25, 2015.

BACKGROUND OF THE INVENTION

Field of the Invention

The present invention relates to an intake manifold disposed in an internal combustion engine, and more particularly to an intake manifold having a flame damper incorporated in an intake passage.

Description of the Related Art

Conventionally, a manifold structure is realized by a small number of resin members to form an intake manifold disposed in an internal combustion engine mounted on a PWC (Personal Water Craft) such as a water motorbike, an outboard motor, and the like, and incorporating a flame damper (flame arrester) with a flame suppression structure disposed in the intake passage of the engine on the downstream side of the throttle body, thereby to enhance the function for preventing flashback from the combustion chamber side.

An intake manifold in which a flame damper is fitted in order to be able to abut against an annular fitting holding portion disposed in the base member in the axial direction among the base member and the cover member facing each other in the radical direction of an intake passage, and the flame damper is pressed in the retaining direction with respect to the fitting holding portion by an annular pressing portion provided on the cover member is known as an example of this kind of intake manifold (see, for example, Patent Document 1).

Further, an intake manifolds in which a fitting recessed portion in which a flame damper may be fitted in the radial direction is provided in the base member, and a band-shaped flame damper fixing member is brought into contact with the outer peripheral surface of the flame damper which is exposed on the base member, so as to suppress rattling of the flame damper in the radial direction with respect to the base member by welding the cover member from the outside to the base member is known (see, for example, Patent Document 2).

CITATION LIST

Patent Literature

[Patent Document 1] Japanese Unexamined Patent Application Publication No. 2006-46069
[Patent Document 2] Japanese Unexamined Patent Application Publication No. 2015-59431

SUMMARY OF THE INVENTION

Technical Problem

However, in the former conventional intake manifold in which the flame damper is fitted and held to abut against the annular fitting holding portion of the base member in the axial direction is a configuration which provides an abutting portion protruding to the inside of the annular fitting holding portion on the upstream end side of the base member.

For this reason, in the former conventional intake manifolds, it is necessary to use a nesting mold having a slide core capable of forming a fitting inner peripheral surface and an abutment surface of the fitting holding portion in a mold for injection molding of the base member, and, dispose the slide core on the downstream side of the fitting holding portion, thus, there was the problem that a step is easily formed on the inner wall surface of the curved intake passage.

On the other hand, the latter conventional intake manifold which fits the flame damper radially into the base member, and uses a flame fixing member having additional parts to suppress rattling in the radial direction of the flame damper is a configuration in which the flame damper having a larger specific gravity than the resin members is held by a welding joint portion.

As a result, not only does the welded joint portion between the base member and the cover member becomes wider, and the size of the intake manifold becomes larger, but when the fitting of the flame damper to the base member is loose, the holding of the flame damper and the strength of the welding bond between the base member and the cover member is insufficient. Furthermore, the fitting direction of the flame damper to the base member is in the radial direction, thus, the strength of the fitting varies easily, and accordingly it was necessary that the welded joint portion of the base member and the cover member be large.

It is the object of the present invention which was made to solve the above problems, to provide an intake manifold which provides a fitting holding portion which abuttingly fits and holds a flame damper in the axial direction in a base member, while reliably preventing a step from forming on an inner wall surface of an intake passage.

Means to Solve the Problem

In order to accomplish the above object, the intake manifold according to the present invention comprises: a base member and a cover member, respectively made of resin and extending along an intake passage, the base member and the cover member facing each other in the radical direction of the intake passage; and a flame damper having a flame suppression structure, the flame damper incorporated in a one end side portion of the base member so as to be positioned on the intake passage, wherein the one end side of the base member includes a recessed body portion having a substantially split cylindrical shape and a fitting holding portion integrally formed with the recessed body portion to hold the flame damper by fitting the flame damper in the axial direction so as to be able to abut against the fitting holding portion, the fitting holding portion includes an abutment surface which may abut against one end of the flame damper and a fitting inner peripheral wall surface that surrounds an outer peripheral portion of the flame damper to fit the flame damper therein, the recessed body portion includes a first inner wall surface that continues to the fitting inner peripheral wall surface of the fitting holding portion and a second inner wall surface that connects to the first inner wall surface through a radial stepped surface, and a retaining rectifying member, provided between the other end of the flame damper which is held by the fitting holding portion and the stepped surface of the recessed body portion, retains the flame damper with respect to the fitting holding portion and forms a third inner wall surface continuous without a step from an opening portion of the other end side of the flame damper to the second inner wall surface of the recessed body portion.

The intake manifold of the present invention may be so constructed that, the retaining rectifying member includes a plate-like protruding portion that protrudes from the first inner wall surface of the recessed body portion in the radial direction of the intake passage, the plate-like protruding portion has a through hole that penetrates in a plate thickness direction arranged therein, and the base member has a fixing pin that fits into the through hole of the plate-like protruding portion arranged thereon.

In addition, the intake manifold of the present invention, an elastic holder member, including an outer peripheral fitting portion fitted into the fitting holding portion and an abutting portion surrounding the opening portion of the other end side and abutting against and engaging with the retaining rectifying member, may integrally be fitted in the flame damper.

Further, the intake manifold of the present invention may also be so constructed that, the retaining and rectifying member has a cylindrical shape, the cover member includes a cover side first inner wall surface and a cover side second inner wall surface, the cover side first inner wall surface disposed at a position continuing to the fitting inner peripheral wall surface of the fitting holding portion of the base member, the cover side second inner wall surface connected to the cover side first inner wall surface through a cover side stepped surface in a radial direction, and the retaining rectifying member retains the flame damper with respect to the fitting holding portion between the other end of the flame damper held by the fitting holding portion and the cover side stepped surface, and forms a cover side third inner wall surface continuous without a step from the opening portion of the other end side of the flame damper to the cover side second inner wall surface of the cover member.

Effect of the Invention

According to the present invention, it is possible to provide an intake manifold which provides a fitting holding portion which abuttingly fits and holds a flame damper in the axial direction in a base member, while reliably preventing a step from forming on an inner wall surface of an intake passage.

DETAILED DESCRIPTION OF THE INVENTION

Hereinafter, embodiments for carrying out the present invention will be described with reference to the drawings.

FIGS. 1 to 10 show the intake manifold according to one embodiment. This intake manifold is disposed as a main part of an intake device in a three-cylinder internal combustion engine (hereinafter simply referred to as "engine") for PWC which slides on water.

Figure 2:
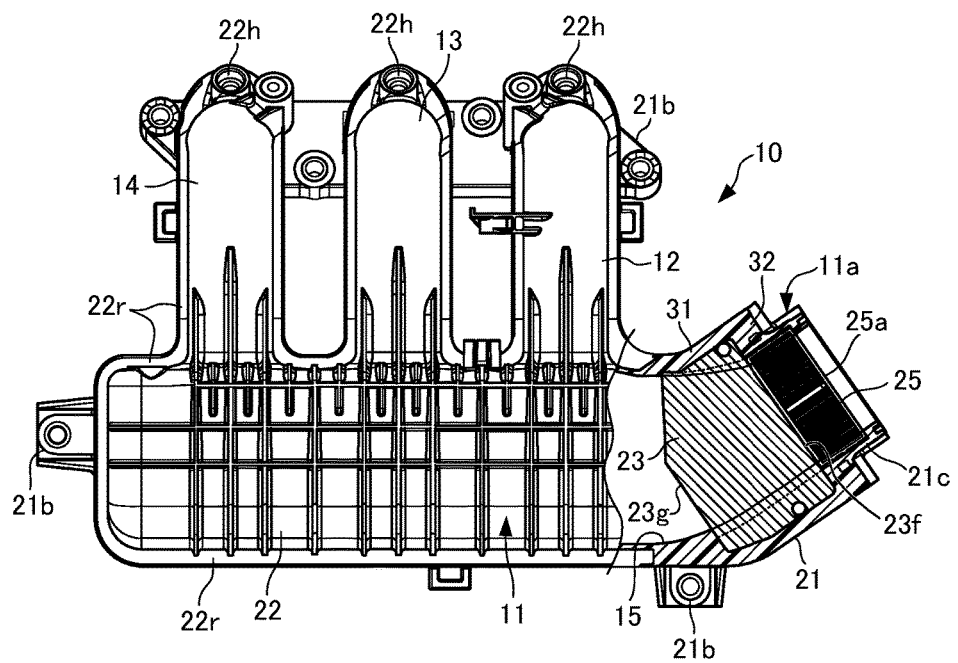
FIG. 2 is a plan view inclusive of a main part layout illustration of the intake manifold according to one embodiment of the present invention.

As shown in FIG. 2, the intake manifold 10 having a manifold shape includes a main pipe portion 11 having an open upstream portion 11a, and a plurality of branch pipes 12, 13, and 14 branched from the main pipe portion 11 to be connected to the three intake ports of the above-described engine. And, each of the plurality of branch pipe portions 12, 13, 14 has an intake passage 15 formed therein, so that intake air taken from an intake pipe (not shown) can be sucked into a plurality of cylinders of the engine.

The main pipe portion 11 has a shape that allows the main pipe portion 11 to function as a surge tank, and the plurality of branch pipe portions 12, 13, 14 are bifurcated substantially in the same direction from the main pipe portion 11 while branching substantially in parallel with respect to each other.

Figure 1:
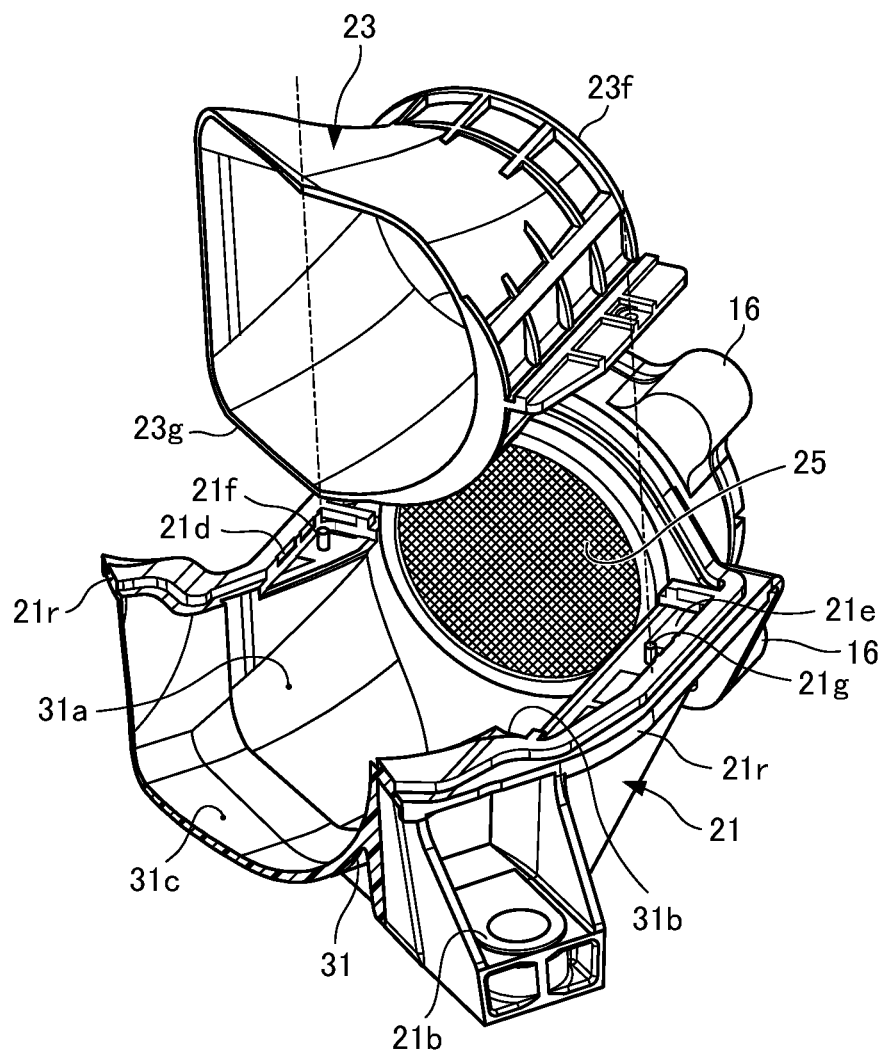
FIG. 1 is an exploded perspective view of essential parts of the intake manifold according to one embodiment of the present invention.
Figure 3:
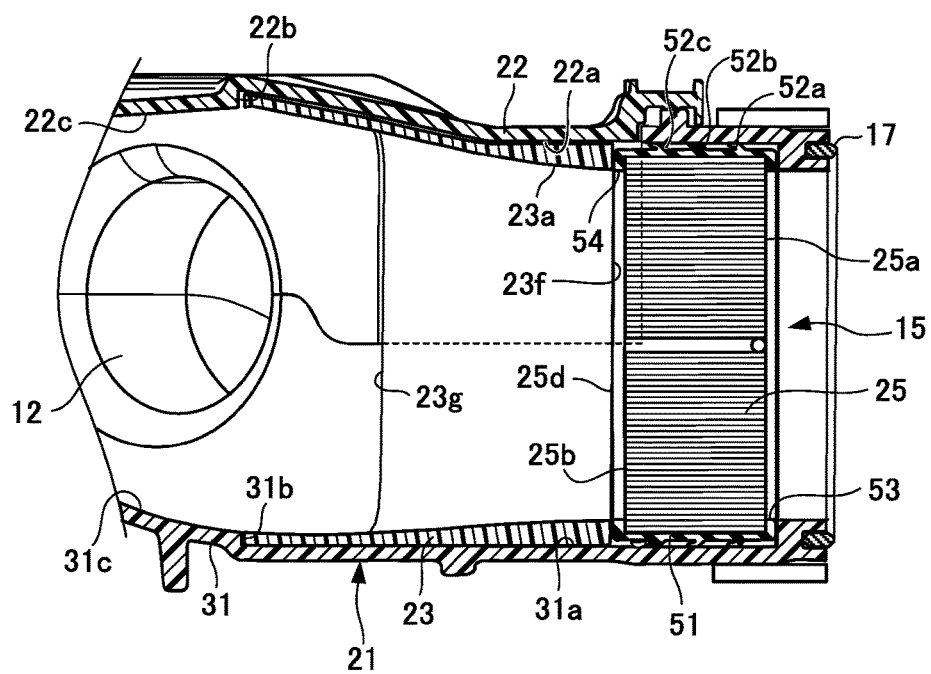
FIG. 3 is a longitudinal cross-sectional side view showing an upstream end side portion of an intake manifold according to an embodiment of the present invention viewed toward the intake branch pipe direction.
Figure 8:
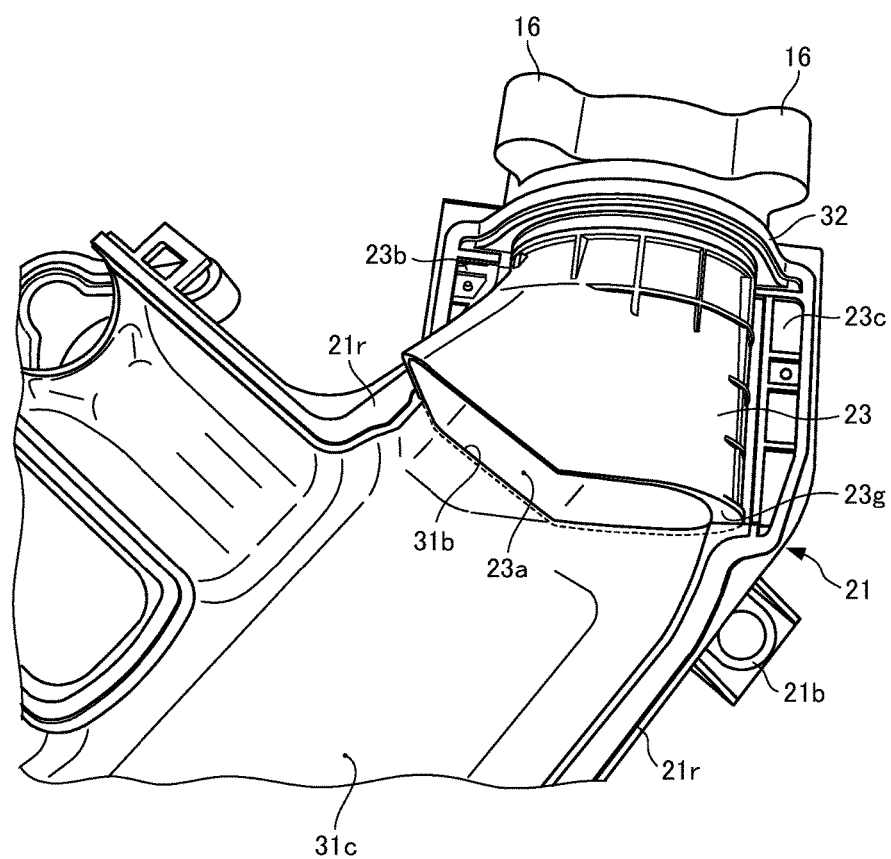
FIG. 8 is a main perspective view showing a state of the intake manifold according to an embodiment of the present invention, wherein the flame damper and the retaining rectifying member are assembled on the base member.

As shown in FIGS. 1 and 8, a plurality of bolt coupling portions 16 bolted to a throttle body (not shown) are provided on the upstream side portion 11a of the main pipe portion 11, and as shown in FIG. 3, a seal ring 17 for sealing the bolt coupling portions 16 is provided. Each of the plurality of bolt coupling portions 16 has a nut embedded therein by a method such as insert molding or the like.

The main pipe portion 11 and the branch pipe portions 12, 13, 14 are formed in a manifold shape by joining the resin-made recessed base member 21 and the resin-made cover member 22, which are extended along the intake passage 15 and face each other in the radial direction of the intake passage 15, for example, by means of vibration welding or the like.

The base member 21 and the cover member 22 respectively have an inner wall surface shape of a substantially semicircular cross section and flange-like joint portions 21r, 22r extending outwardly from the respective side walls, throughout the region in most part of the passage length formed by the main pipe portion 11 and the branch pipe portions 12, 13, 14. Further, the flange-like joint portions 21r, 22r are integrally welded and joined to each other at rib-like protruding portions in the widthwise center portions thereof.

As shown in FIGS. 1 and 2, the base member 21 is provided with a plurality of attachment bracket portions 21b for fastening bolts to the engine side member, and the cover member 22 has a plurality of injector attachment hole portions 22h formed therein.

In the vicinity of the upstream side end portion of the intake passage 15 inside the intake manifold 10 is provided a flame arrester 25 (flame damper) having a known flame suppressing structure incorporated therein.

As shown in FIGS. 1 to 4, the flame arrester 25 is a corrugated flame suppressing structure in which a thin stainless steel plate formed into a corrugated shape, for example, is wound and arranged in parallel to form a large number of narrow passageways in a honeycomb shape in the shape of a short cylinder. This flame suppression structure has a large number of narrow passageways which are small in intake resistance and small enough to block the passage of the flame to the upstream side. Each of the narrow passageways is formed by a metal surface cooled by heat exchange with the intake air.

Further, the flame arrester 25 is incorporated in the one end side portion 21c of the base member 21 positioned on the right end side of the intake manifold 10 in FIG. 2, and is held to be positioned in the intake passage 15.

As shown in FIGS. 1 to 5 and 8, the one end side portion 21c of the base member 21 includes a substantially split cylindrical recessed body portion 31 and an annular fitting holding portion 32 integrally formed with the recessed body portion 31. The recessed body portion 31 and the fitting holding portion 32 have an inner wall surface shape curved with a radius of curvature close to the radius of the flame arrester 25. The annular fitting holding portion 32 is arranged to hold the flame arrester 25 by fitting the flame arrester 25 in the axial direction so as to be able to abut against the fitting holding portion 32.

The upstream side portion 11a of the main pipe portion 11, forming a part of the intake passage 15, is formed in a predetermined section of the intake passage 15 adjacent to the downstream side of the flame arrester 25 and has an inner wall surface gently inclined with respect to the central axis line.

To be more specific, the fitting holding portion 32 has an annular plate-shaped abutment surface 32a and a short cylindrical fitting inner peripheral wall surface 32b. The abutment surface 32a allows the flame arrester 25 to be butted against in the axial direction around the opening portion on one end side 25a of the flame arrester 25. The fitting inner peripheral wall surface 32b is surrounding the outer periphery of the flame arrester 25, while having the flame arrester 25 axially fitted therein.

Figure 4:
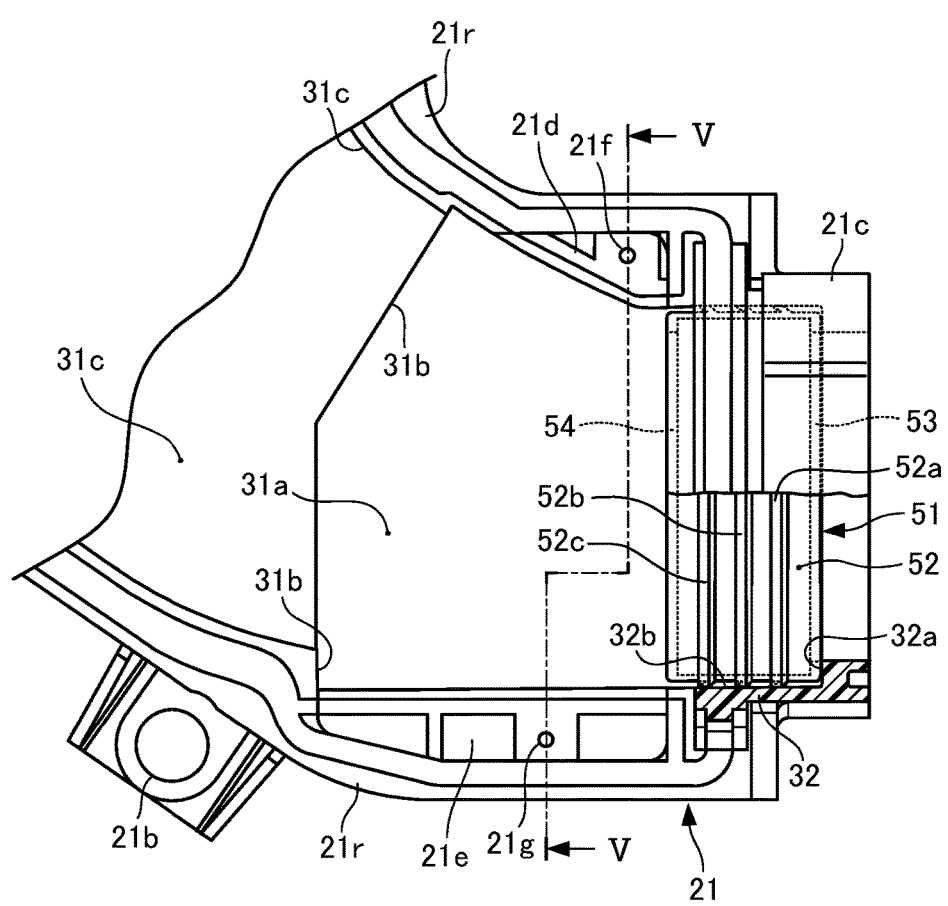
FIG. 4 is a partial enlarged plan view of the one end side portion the base member of the intake manifold according to one embodiment of the present invention.
Figure 5:
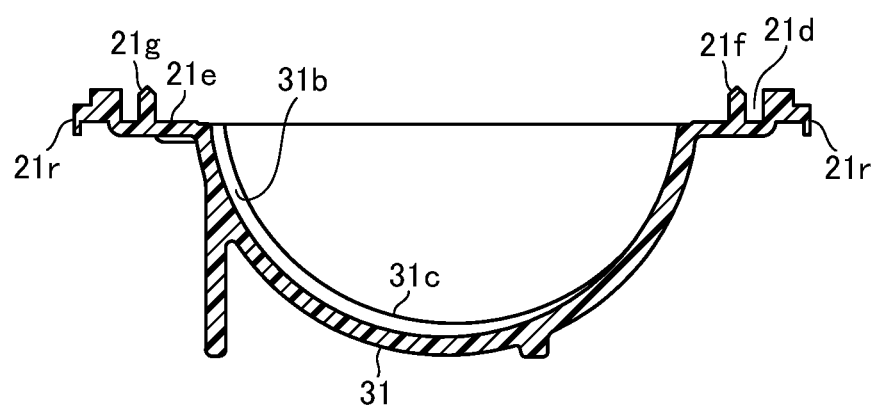
FIG. 5 is a cross-sectional view taken along the line V-V in FIG. 4.

As shown in FIGS. 3 to 5, the recessed body portion 31 has a first inner wall surface 31a of a semicircular cross-section continuing to about half of the fitting inner peripheral wall surface 32b of the fitting holding portion 32. Further, the recessed body portion 31 has formed therein a base side second inner wall surface 31c of a semicircular cross section steppedly connected to the first inner wall surface 31a through an arcuate radial stepped surface 31b.

Between the flame arrester 25 held by the fitting holding portion 32 and the radial stepped surface 31b of the recessed body portion 31, a resin-made retaining rectifying member 23, made of the same resin material as the base member 21 and the cover member 22, is provided.

The retaining rectifying member 23 extends over the entire area between the other end surface 25d of the flame arrester 25 and the radial stepped surface 31b of the recessed body portion 31, to have a sufficient length in the axial direction to retain the flame arrester 25 with respect to the fitting holding portion 32.

Figure 9:
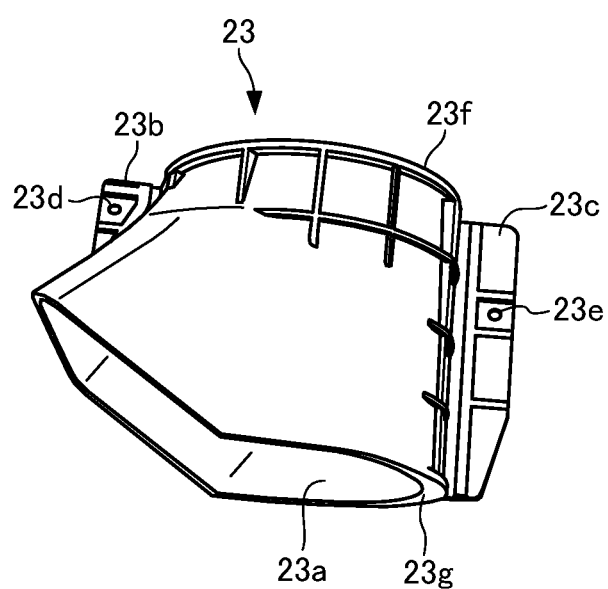
FIG. 9 is a perspective view of a retaining rectifying member of an intake manifold according to an embodiment of the present invention.

As shown in FIG. 9, the retaining rectifying member 23 is formed in a tubular shape having an inner diameter and an outer diameter larger at the downstream end side than at the upstream end side. The inner peripheral surface 23a of the retaining rectifying member 23 forms a third inner wall surface continuous without a step from the opening portion on the other end side 25b of the flame arrester 25 to the base side second inner wall surface 31c of the recessed body portion 31.

Further, the retaining rectifying member 23 has plate-shaped protruding portions 23b, 23c protruding radially outwardly of the intake passage 15 from the first inner wall surface 31a of the recessed body portion 31. These plate-shaped protruding portions 23b, 23c respectively have formed therein through holes 23d, 23e penetrating in the plate thickness direction.

The retaining rectifying member 23 is also so formed that the wall thickness including the rib height at the right end side portion shown in FIG. 8 is larger than that at other portions. The upstream side end surface 23f of the retaining rectifying member 23 is substantially flat. On the other hand, the downstream side end surface 23g of the retaining rectifying member 23 and the arcuate radial stepped surface 31b on the base member 21 side respectively have a portion inclined with respect to the upstream side end surface 23f and a portion parallel with respect to the upstream side end surface 23f.

On the other hand, the base member 21 is provided with recesses 21d, 21e for accommodating the plate-like protruding portions 23b, 23c and fixing pins 21f, 21g protruding from the inner bottom wall surface side of the recesses 21d, 21e and penetrating the through holes 23d, 23e of the plate-like protruding portions 23b, 23c.

The flame arrester 25 has an elastic holder member 51 integrally attached thereto.

The elastic holder member 51 is made of an elastic material, prepared for rubber elasticity, hardness, heat resistance, chemical resistance, etc. suitable for the use conditions of the flame arrester 25, for example, a blended elastic material by blending PVC (vinyl chloride) to a nitrile rubber (NBR) at a predetermined blending ratio.

Figure 6A:
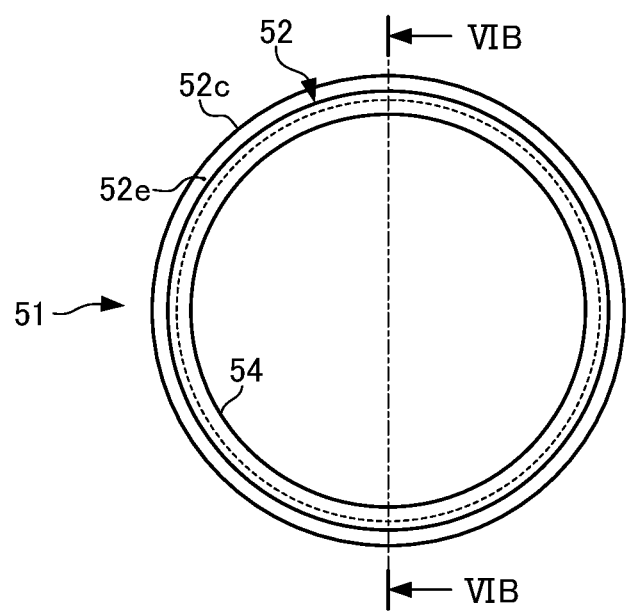
FIG. 6A is a front view of the abutting portion of the elastic holder of the flame damper assembled on the base member of the intake manifold according to one embodiment of the present invention.
Figure 6B:
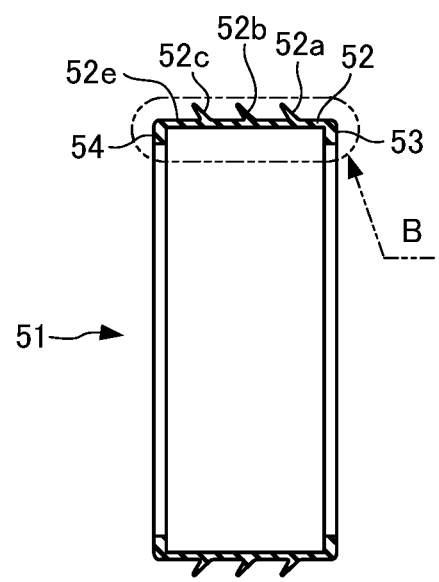
FIG. 6B is a sectional view taken along line VIB-VIB in FIG. 6A.
Figure 7:
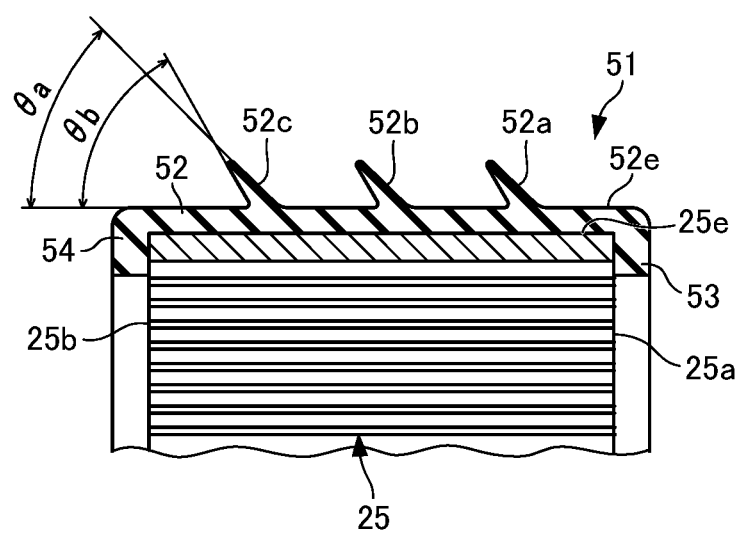
FIG. 7 is a partial enlarged view showing part B in FIG. 6B.

As shown in FIGS. 6A, 6B and 7, the elastic holder member 51 includes an outer peripheral fitting portion 52 (outer peripheral portion) fitted to the fitting holding portion 32 while closely contacting the outer peripheral surface 25e of the flame arrester 25, an abutting portion 53 on one side in the axial direction both end sides of the portion 52 and an abutting portion 54 on the other side in the axial direction both end sides of the portion 52. The abutting portion 53 on one side abuts against and is engages with an annular plate-like abutment surface 32a of the fitting holding portion 32 while surrounding the opening portion on one end side 25a of the flame arrester 25. Further, the abutting portion 54 on the other side abuts against and is engaged with the retaining rectifying member 23 while surrounding the opening portion on the other end side 25b of the flame arrester 25.

To be more specific, on the outer peripheral fitting portion 52 of the elastic holder member 51, a plurality of, for example, three annular seal lips 52a, 52b, 52c parallel to each other are formed to protrude on the outer peripheral surface 25e to be spaced apart from each other by a predetermined distance in the axial direction. The seal lips 52a, 52b, 52c are respectively inclined with respect to the central axis line and the outer peripheral surface 25e of the flame arrester 25, so that the inclination angle $\theta a$ is formed on the outer peripheral surface side thereof and the inclination angle $\theta b$ is formed on the inner peripheral surface side thereof. The inclination angle θa on the outer peripheral surface side is, for example, 45 degrees and the inclination angle θb on the inner peripheral surface side is, for example, 60 degrees. Therefore, since the inclination angle θa of the outer peripheral surface side is set to be smaller than the inclination angle θb of the inner peripheral surface side, the seal lips 52a, 52b, 52c respectively become thinner as the radius increases, so that the seal lips 52a, 52b, 52c are formed in an easily bent lip shape.

Further, the outer diameters of the seal lips 52a, 52b, 52c in a free form are larger than the inner diameter of the fit inner peripheral wall surface 32b of the fitting holding portion 32. When integrally disposed with the flame arrester 25 and fitted into the fitting holding portion 32, the outer peripheral side portions of the seal lips 52a, 52b, 52c are respectively brought into airtight contact with the fitting inner peripheral wall surface 32b of the cylinder block 32 with a predetermined contact surface pressure and a predetermined contact width.

On the other hand, as shown in FIG. 3, the cover member 22 has a cover side first inner wall surface 22a and a cover side second inner wall surface 22c each having a substantially semicircular transverse cross section. The cover side first inner wall surface 22a is disposed at a position continuing to the fitting inner peripheral wall surface 32b of the fitting holding portion 32 of the base member 21, while the cover side second inner wall surface 22c is connected to the cover side first inner wall surface 22a through a cover side stepped surface 22b in the radial direction.

Further, the retaining rectifying member 23 is disposed between the other end of the flame arrester 25 held by the fitting holding portion 32 and the cover side stepped surface 22b, so as to retain the flame arrester 25 with respect to the fitting holding member 23, through the cover member 22 fixed to the base member 21 by means of welding or the like. Further, the upper half of the inner peripheral surface 23a of the retaining rectifying member 23 forms a third inner wall surface that extends from the opening portion on the other end side 25b of the flame arrester 25 to the cover side second inner wall surface 22c of the cover member 22.

It can be understood from the foregoing that the base side third inner wall surface and the cover side third inner wall surface are integrally formed by the inner peripheral surface 23a of the retaining rectifying member 23. Thus, an inner wall surface of the intake passage 15 continuous without a step is formed from the opening portion on the other end side 25b of the flame arrester 25 to the base side second inner wall surface 31c and the cover side second inner wall surface 22c.

Next, an example of a method for integrally molding the split cylindrical recessed portion 31 of the base member 21 and the annular fitting holding portion 32 will be described with reference to FIG. 10. In addition, the relationship between the first inner wall surface 31a and the base side second inner wall surface 31c of the semicircular cross section steppedly connected to the first inner wall surface 31a through the radial stepped surface 31b will be described.

While an upper end of the recessed body portion 31 is opened, the annular fitting holding portion 32 has a shape in which the flame arrester 25 is fitted into the recessed body portion 31 so as to be capable of abutting in the axial direction. This means that, while the recessed body portion 31 can be molded by a simple molding die with the vertical direction in FIG. 2 as the mold opening/closing direction, the annular fitting holding portion 32 is formed such that the recessed body portion 31 is formed in the molding die using a slide core that moves in the left/right direction is required.

Moreover, the inner diameter of the annular fitting holding portion 32 is smaller on the outer end side (the upstream end side of the base member 21) having the abutment surface 32a, and becomes larger on the inner end side where the fitting inner peripheral wall surface 32b is formed. Therefore, as shown in an example in FIG. 10, when demolding the molded base member 21, it is necessary to slide a slide core 61 toward the side of the recessed body portion 31.

Figure 10:
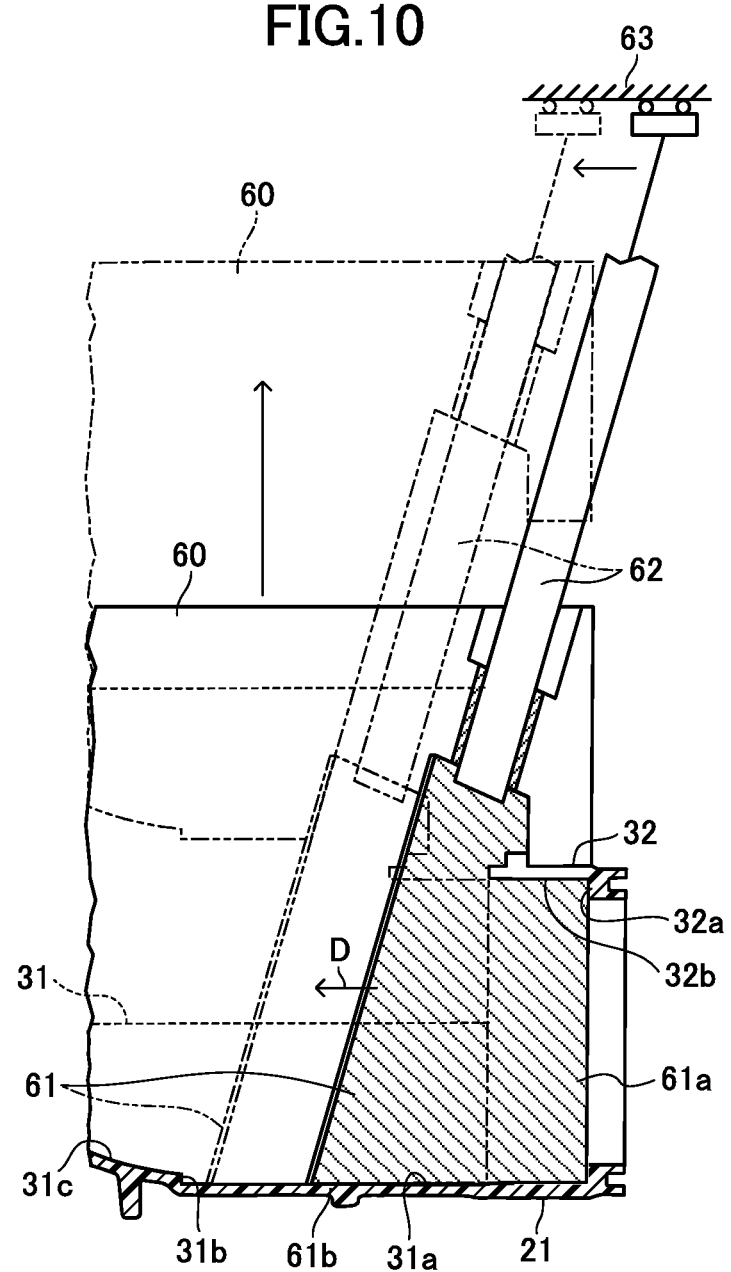
FIG. 10 is an explanatory diagram of a schematic configuration of a mold having a slide core for forming the base member of the intake manifold according to an embodiment of the present invention.

Therefore, the recessed body portion 31 has formed therein the first inner wall surface 31a of a semicircular cross section having the same radius and continuous to the lower half portion of the fitting inner peripheral wall surface 32b of the fitting holding portion 32 in FIG. 10. The arcuate radial stepped surface 31b is formed between the first inner wall surface 31a and the base side second inner wall surface 31c which is the inner peripheral wall surface forming the intake passage 15.

In FIG. 10, a fixed side mold is arranged on the lower side of the formed base member 21, and a movable side mold 60, movable in the vertical direction in FIG. 10 with respect to the fixed side mold, is disposed. The slide core 61 is engaged with the movable side mold 60 so as to be relatively movable obliquely upward and downward in FIG. 10 with respect to the movable side mold 60. The slide core 61 is restricted its upward movement in FIG. 10 by an ejector plate 63 through a shaft 62.

The ejector plate 63 is supported so as to be relatively movable and fixed with respect to a mold plate or the like that supports the movable side mold 60 so as to be relatively movable in the vertical direction in FIG. 10 with respect to the movable side mold 60, for example. Therefore, when the movable side mold 60 is moved in the mold opening direction with respect to a fixed side mold, the slide core 61 can be slid in the direction of an arrow D in FIG. 10 with respect to the ejector plate 63 and the fixed side mold, in accordance with the upward movement amount of the movable side mold 60.

As indicated by imaginary (dotted) lines in FIG. 10, the slide core 61 can be slid to a position where a distal end portion 61a, which forms the fitting inner peripheral wall surface 32b of the annular fitting holding portion 32, comes out of the fitting inner peripheral wall surface 32b. During the slide of the slide core 61, a bottom surface 61b of the slide core 61 moves within a formation region of the first inner wall surface 31a. Therefore, the distal end portion 61a of the slide core 61 completely escapes from the fitting inner peripheral wall surface 32b, and the movable side mold 60 is moved in the mold opening direction with respect to the fixed side mold, thereby making it possible to take out the molded base member 21.

Next, the operation will be described.

In the intake manifold 10 of the present embodiment constructed as described above, when the flame arrester 25 is fitted into the fitting holding portion 32 of the base member 21 so as to be able to abut against the fitting holding portion 32 in the axial direction, the flame arrester 25 is concentrically held in the fitting holding portion 32.

And, when the retaining rectifying member 23 is assembled between the flame arrester 25 and the radial stepped surface 31b of the recessed body portion 31, the retaining rectifying member 23 causes the flame arrester 25 to be retained with respect to the retaining rectifying member 23. The inner peripheral surface 23a of the retaining rectifying member 23 forms a third inner wall surface continuous from the opening portion on the other end side 25b of the flame arrester 25 to the base side second inner wall surface 31c of the recessed body portion 31 without a step.

Therefore, although the first inner wall surface 31a and the radial stepped surface 31b are formed in the recessed body portion 31 adjacent to the fitting holding portion 32, the inner wall surface of the intake passage 15 is formed with no step by the retaining rectifying member 23 which restricts the axial movement of the flame arrester 25.

In addition, since the flame arrester 25, having the elastic holder member 51 provided therein, is fitted into the annular fitting holding portion 32, the flame arrester 25 can be attached to the base member 21 while sufficiently securing airtightness around the flame arrester 25, thereby making it unnecessary to use a holding plate or the like for fixing the flame arrester 25 to the base member 21. Since the flame arrester 25 is held by the annular fitting holding portion 32, the welded joint portion of the base member 21 and the cover member 22 does not receive the weight or inertial force of the flame arrester 25, thereby making it possible to narrow the welded joint portion between the base member 21 and the cover member 22.

As a result, the intake manifold 10 does not have a large diameter at an accommodating portion of the flame arrester 25, while sufficiently securing the holding strength of the flame arrester 25, the coupling strength of the base member 21 and the cover member 22, thereby making it possible to effectively suppress the mounting size and the mounting height.

Further, in the present embodiment, the plate-like protruding portions 23b, 23c of the retaining rectifying member 23 are accommodated in the recesses 21d, 21e of the base member 21, and the fixing pins 21f and 21g on the member 21 side are fitted in the through holes 23d, 23e of the plate-like protruding portions 23b, 23c. Therefore, it becomes possible to easily fix the retaining rectifying member 23 to the base member 21 by welding or the like. In addition, it is possible to stably hold the abutment posture of the retaining rectifying member 23 against the flame arrester 25 in the contacting posture between the base member 21 and the plate-like protruding portions 23b, 23c, and also the assembling posture of the flame arrester 25 on the base member 21 can be stabilized.

Furthermore, in the present embodiment, since the elastic holder member 51 is integrally attached to the flame arrester 25, both the flame arrester 25 and the retaining rectifying member 23 can be assembled to the base member 21 without rattling.

In addition, in the present embodiment, the inner peripheral surface 23a of the retaining rectifying member 23 is formed as a cover side third inner wall surface continuing without a step, between the opening portion on the other end side 25b of the flame arrester 25 and the cover-side second inner wall surface 22c of the cover member 22 as well. Therefore, formation of a step can be reliably prevented throughout the entire inner peripheral surface of the intake passage 15, by providing the base-side second inner wall surface 31c of the base member 21, the cover-side second inner wall surface 22c of the cover member 22, and the inner peripheral surface 23a of the retaining rectifying member 23.

Further, in the present embodiment, the downstream side end surface 23g of the retaining rectifying member 23 and the radial stepped surface 31b on the side of the base member 21 have inclined portions with respect to the upstream side end surface 23f, respectively. Therefore, when the retaining rectifying member 23 is fitted between the flame arrester 25 and the step surface 31b in the radial direction of the base member 21, the retaining rectifying member 23 receives a reaction force from the elastic holder member 51 while being urged to one specific side in the axial direction. As a result, the retaining rectifying member 23 is positioned and held at a fixed position in the radial direction without rattle, thereby improving the precision of the assembling position of the retaining rectifying member 23, the abutting attitude to the flame arrester 25, the fixed attitude with respect to the base member 21, and the like.

As can be understood from the foregoing, in the present embodiment, it is possible to provide an intake manifold 10 in which formation of a step on the inner wall surface of the intake passage 15 can be securely prevented, while the annular fitting holding portion 32 for fitting and abutting the flame arrester 25 in the axial direction is provided on the base member 21.

When the intake manifold 10 is mounted, the throttle body is bolted to the upstream side portion 11a of the main pipe portion 11, and the joint portion thereof is sealed by the seal ring 17. When an engine having the intake manifold 10 disposed thereon is operated, air is introduced into the intake manifold 10 through the flame arrester 25 according to the intake operation of the engine. Fuel is injected from the injector into the intake air on the downstream side of the throttle valve in the throttle body to form an air-fuel mixture, which in turn is burnt in the combustion chamber in the engine.

Since the engine of this embodiment is mounted on a PWC such as a water bike or an outboard motor or the like, there is a possibility that backfire may occur at the time of operation. To be more specific, in case the fuel in the combustion chamber is lean or water is sucked in and ignition failure or the like occurs, the combustion in the combustion chamber does not normally end in the explosion stroke. Therefore, when the intake valve opens next time, such a phenomenon may occur in which even the air-fuel mixture in the intake manifold 10 is ignited. However, in the upstream side of the intake passage 15 in the intake manifold 10, when the flame due to backfire reaches the flame arrester 25, the flame is blocked by the flame arrester 25. Therefore, propagations of the flame due to backfire to the upstream side of the intake manifold 10 are securely suppressed, and damages to the intake system parts, the sensors, and the like are reliably prevented.

In the above-described embodiment, the base member 21 and the cover member 22 are joined by welding, but it goes without saying that any other joining method can be adopted.

Although a plurality of annular seal lips 52a to 52c are provided on the outer peripheral fitting portion 52 of the elastic holder member 51, vertical ribs or the like protruding and equally spaced apart in the peripheral direction may also be additionally disposed outside of the outer fitting portion 52 at a lower height than the annular seal lips 52a to 52c.

The elastic holder member 51 may not be attached to the flame arrester 25. The fitting holding portion 32 of the base member 21 may have an elastic seal ring interposed in an inner deep side thereof. The fitting holding portion 32 may have an inner seal rib, a longitudinal groove for inserting an elastic material or the like formed in an inner periphery thereof.

Furthermore, in the present embodiment, the flame arrester 25 is formed in a short cylindrical shape, but the shape thereof may be arbitrary. It may otherwise be a polygonal prism shape or both end surfaces thereof may not be parallel. Both end surfaces of the flame arrester 25 may not be flat or may be inclined with respect to the intake direction.

Still further, although the flame arrester 25 has a corrugated flame suppressing structure, it is needless to say that the flame arrester 25 can have other arbitrary flame suppressing structure such as a wire mesh type.

As described above, according to the present invention, it is possible to provide an intake manifold which provides a fitting holding portion which abuttingly fits and holds a flame damper in the axial direction in the base member, while reliably preventing a step from forming on an inner wall surface of an intake passage. The present invention is generally useful for all the intake manifolds in which a flame damper is incorporated in an intake passage.

EXPLANATION OF REFERENCE NUMERALS

10 intake manifold
11 main pipe section
11*a* upstream portion
12, 13, 14 branch pipe section
15 intake passage
21 base member
21*d*, 21*e* recess
21*f*, 21*g* fixing pin
21*r*, 22*r* flange-like joint portion
22 cover member
22*a* cover side first inner wall surface
22*b* cover side stepped surface
22*c* cover side second inner wall surface
23 retaining rectifying member
23*a* inner peripheral surface (third inner wall surface, cover side third inner wall surface)
23*b*, 23*c* plate-like protruding portion
23*d*, 23*e* through hole
23*f* upstream end surface
23*g* downstream end surface
25 flame arrester (flame damper)
25*a* opening portion on one end side
25*b* opening portion on the other end side
31 recessed body portion
31*a* first inner wall surface
31*b* radial stepped surface
31*c* second inner wall surface
32 fitting holding portion
32*a* abutment surface
32*b* fitting inner peripheral wall surface
51 elastic holder member
52 outer peripheral fitting portion (outer peripheral portion)
52*a*, 52*b*, 52*c* seal lip
53 abutting portion on one side
54 abutting portion on the other side
60 movable side mold
61 slide core
61*a* distal end portion
61*b* bottom surface
62 shaft
63 ejector plate
θa inclination angle
θb inclination angle

The invention claimed is:

1. An intake manifold, comprising:
a base member and a cover member, respectively made of resin and extending along an intake passage, the base member and the cover member facing each other in the radial direction of the intake passage; and
a flame damper having a flame suppression structure, the flame damper incorporated in a one end side portion of the base member so as to be positioned on the intake passage, wherein
the one end side of the base member includes a recessed body portion having a substantially split cylindrical shape and a fitting holding portion integrally formed with the recessed body portion to hold the flame damper by fitting the flame damper in the axial direction so as to be able to abut against the fitting holding portion,
the fitting holding portion includes an abutment surface which may abut against one end of the flame damper and a fitting inner peripheral wall surface that surrounds an outer peripheral portion of the flame damper to fit the flame damper therein,
the recessed body portion includes a first inner wall surface that continues to the fitting inner peripheral wall surface of the fitting holding portion and a second inner wall surface that connects to the first inner wall surface through a radial stepped surface, and
a retaining rectifying member, provided between the other end of the flame damper which is held by the fitting holding portion and the stepped surface of the recessed body portion, retains the flame damper with respect to the fitting holding portion and forms a third inner wall surface continuous without a step from an opening portion of the other end side of the flame damper to the second inner wall surface of the recessed body portion.

2. The intake manifold as set forth in claim 1, wherein
the retaining rectifying member includes a plate-like protruding portion that protrudes from the first inner wall surface of the recessed body portion in the radial direction of the intake passage,
the plate-like protruding portion has a through hole that penetrates in a plate thickness direction arranged therein, and
the base member has a fixing pin that fits into the through hole of the plate-like protruding portion arranged thereon.

3. The intake manifold as set forth in claim 1, wherein
an elastic holder member, including an outer peripheral fitting portion fitted into the fitting holding portion and an abutting portion surrounding the opening portion of the other end side and abutting against and engaging with the retaining rectifying member, is integrally fitted in the flame damper.

4. The intake manifold as set forth in claim 1, wherein
the retaining and rectifying member has a cylindrical shape,
the cover member includes a cover side first inner wall surface and a cover side second inner wall surface, the cover side first inner wall surface disposed at a position continuing to the fitting inner peripheral wall surface of the fitting holding portion of the base member, the cover side second inner wall surface connected to the cover side first inner wall surface through a cover side stepped surface in a radial direction, and
the retaining rectifying member retains the flame damper with respect to the fitting holding portion between the other end of the flame damper held by the fitting holding portion and the cover side stepped surface, and forms a cover side third inner wall surface continuous without a step from the opening portion of the other end side of the flame damper to the cover side second inner wall surface of the cover member.

* * * * *